(12) United States Patent
Chang

(10) Patent No.: US 10,912,430 B1
(45) Date of Patent: Feb. 9, 2021

(54) PAPER QUANTITY DETECTION DEVICE AND PAPER CONTAINING BOX HAVING THE PAPER QUANTITY DETECTION DEVICE

(71) Applicant: FANER AROMA PRODUCT CO., LTD., Guangzhou (CN)

(72) Inventor: Hsu-Hui Chang, New Taipei (TW)

(73) Assignee: FANER AROMA PRODUCT CO., LTD., Guangzhou (CN)

( * ) Notice: Subject to any disclaimer, the term of this patent is extended or adjusted under 35 U.S.C. 154(b) by 0 days.

(21) Appl. No.: 16/820,736

(22) Filed: Mar. 17, 2020

(51) Int. Cl.
*A47K 10/38* (2006.01)
*G01V 8/20* (2006.01)
*G08B 21/24* (2006.01)

(52) U.S. Cl.
CPC ............ *A47K 10/38* (2013.01); *G01V 8/20* (2013.01); *G08B 21/24* (2013.01); *A47K 2010/389* (2013.01)

(58) Field of Classification Search
CPC .......... A47K 10/38; G01V 8/20; G08B 21/24
See application file for complete search history.

(56) References Cited

U.S. PATENT DOCUMENTS

| 2005/0171634 A1* | 8/2005 | York | G16H 40/20 700/231 |
|---|---|---|---|
| 2018/0188105 A1* | 7/2018 | Huang | H01L 25/165 |
| 2019/0112136 A1* | 4/2019 | Dahlqvist | B65H 3/128 |

* cited by examiner

Primary Examiner — Curtis B Odom

(57) ABSTRACT

A paper quantity detection device, which evaluates remaining paper quantity cyclically, is power-efficient, and reduces manual confirmation time and cost, includes a circuit board, two infrared detection components, a wireless signal emitting component and a control component. The two infrared detection components are disposed on two opposing sides of the circuit board, respectively. The infrared detection components each include an infrared emitter and an infrared receiver. The wireless signal emitting component is disposed on the circuit board. The control component is disposed on the circuit board, signal-connected to the infrared emitter, infrared receiver and wireless signal emitting component, and adapted to controllably cause the wireless signal emitting component to emit a wireless signal according to a signal condition of the infrared receiver. A roll paper containing box having the paper quantity detection device and a stacked paper containing box having the paper quantity detection device are further introduced.

4 Claims, 4 Drawing Sheets

PAPER QUANTITY DETECTION DEVICE AND PAPER CONTAINING BOX HAVING THE PAPER QUANTITY DETECTION DEVICE

BACKGROUND OF THE INVENTION

1. Field of the Invention

The present disclosure relates to toilet paper, and in particular to a paper quantity detection device and a paper containing box having the paper quantity detection device.

2. Description of the Related Art

In a venue which features frequent use of toilet paper, such as a public toilet, plenty users access a conventional paper containing box for toilet paper. However, the users seldom take note of the remaining paper quantity in the paper containing box before urinating or defecating. Furthermore, the paper containing box is not capable of sensing the paper quantity and giving an alert accordingly. As a result, the odds are that, after urinating or defecating, the users will find the paper containing box run out of toilet paper. To ensure that the paper containing boxes will always contain adequate toilet paper, janitors have to check the paper containing box regularly and one by one. As a result, the prior art is time-consuming, cost-inefficient, and unreliable.

BRIEF SUMMARY OF THE INVENTION

An objective of the present disclosure is to provide a paper quantity detection device and a paper containing box having the paper quantity detection device.

To achieve at least the above objective, the present disclosure provides a paper quantity detection device, comprising: a circuit board; two infrared detection components disposed on two opposing sides of the circuit board, respectively, and each comprising an infrared emitter and an infrared receiver; a wireless signal emitting component disposed on the circuit board; and a control component disposed on the circuit board, signal-connected to the two infrared emitters, the two infrared receivers and the wireless signal emitting component, and adapted to controllably cause the wireless signal emitting component to emit a wireless signal according to a signal condition of the infrared receiver.

In an embodiment of the present disclosure, the control component controllably causes the wireless signal emitting component to emit a wireless reminding signal when one of the infrared receivers receives an infrared signal.

In an embodiment of the present disclosure, the control component controllably causes the wireless signal emitting component to emit a wireless warning signal when the two infrared receivers receive an infrared signal.

In an embodiment of the present disclosure, further comprises an outer casing for covering the circuit board, wherein two hollowed-out portions corresponding in position to the two infrared detection components, respectively, are disposed in the outer casing.

In an embodiment of the present disclosure, the outer casing has two baffles not only disposed at the hollowed-out portions, respectively, but also disposed between the infrared emitter and the infrared receiver of one of the infrared detection components and disposed between the infrared emitter and the infrared receiver of the other infrared detection component, respectively.

In an embodiment of the present disclosure, further comprises a battery sheath and a battery disposed on the circuit board.

The present disclosure further provides a roll paper containing box, comprising: a casing having an axle and an outlet; and the paper quantity detection device disposed in the casing.

In an embodiment of the present disclosure, the paper quantity detection device is positioned proximate to the axle.

In an embodiment of the present disclosure, the paper quantity detection device is positioned distal to the axle.

The present disclosure further provides a stacked paper containing box, comprising: a casing extending in gravity direction and having an outlet facing downward; and the paper quantity detection device disposed in the casing.

Therefore, the paper quantity detection device of the present disclosure manages the remaining paper quantity precisely and detects three paper quantity states, namely full, inadequate, and null, cyclically, thereby precluding abrupt fluctuations of the paper quantity. If the detection signal of the paper quantity detection device changes from being indicative of the null state to being indicative of the full state, it will indicate that the paper containing box has already been replenished. In addition, the paper quantity detection device of the present disclosure consumes little electric power, wirelessly communicates with a management mechanism, effectively reduces manual confirmation time and cost, and thus is applicable to paper containing boxes in various forms.

DETAILED DESCRIPTION OF THE INVENTION

To facilitate understanding of the object, characteristics and effects of this present disclosure, embodiments together with the attached drawings for the detailed description of the present disclosure are provided.

Figure 1:
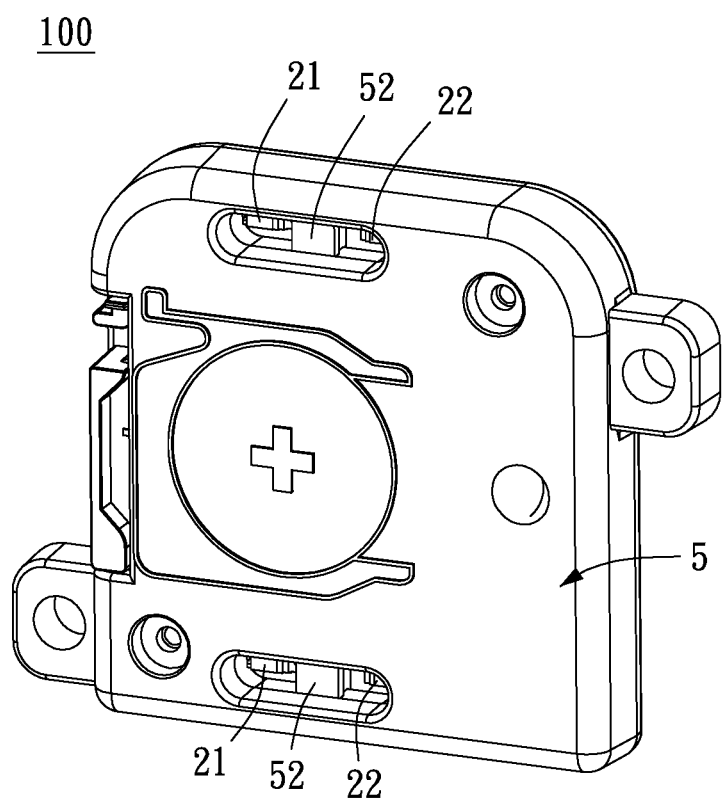
FIG. 1 is a perspective view of a paper quantity detection device according to an embodiment of the present disclosure.
Figure 2:
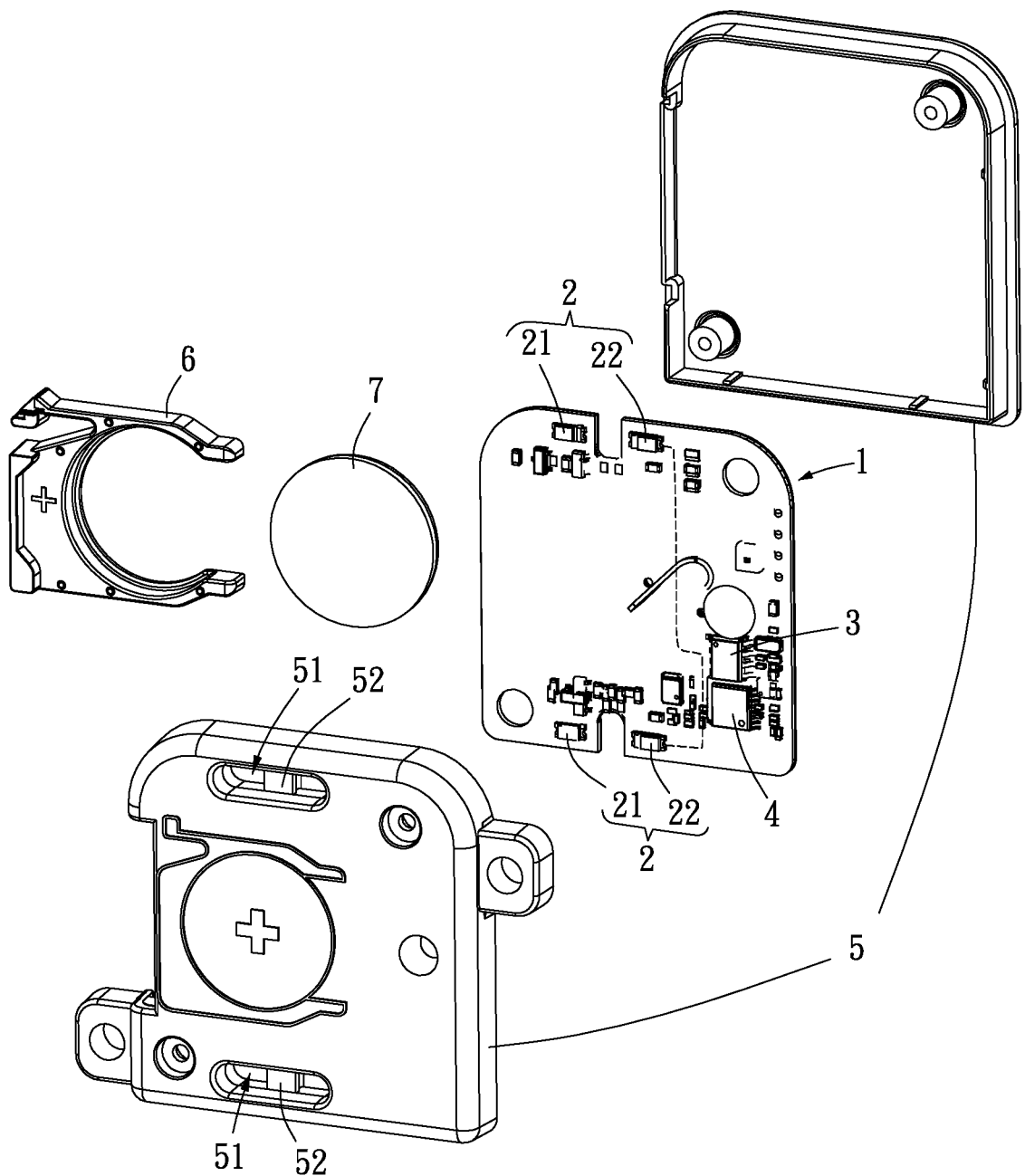
FIG. 2 is an exploded view of the paper quantity detection device according to an embodiment of the present disclosure.

Referring to FIG. 1 and FIG. 2, a paper quantity detection device 100 in an embodiment of the present disclosure comprises a circuit board 1, two infrared detection components 2, a wireless signal emitting component 3 and a control component 4.

The circuit board 1 is a printed circuit board (PCB).

The two infrared detection components 2 are disposed on two opposing sides of the circuit board 1, respectively. The infrared detection components 2 each comprise an infrared emitter 21 and an infrared receiver 22. In the absence of any paper which might otherwise block infrared, infrared emitted from the infrared emitters 21 is received by the infrared receivers 22.

The wireless signal emitting component 3 is disposed on the circuit board 1.

The control component 4 is disposed on the circuit board 1. The control component 4 is signal-connected to the infrared emitters 21, infrared receivers 22 and wireless signal emitting component 3. The control component 4 controllably causes the wireless signal emitting component 3 to emit a wireless signal according to a signal condition of the infrared receivers 22.

In this embodiment, the two infrared detection components 2 are aligned substantially in the direction of reduction in paper. The infrared emitters 21 emit infrared signals toward the casing of a paper containing box. When there is enough paper, the infrared signals emitted from the two infrared emitters 21 are blocked and absorbed by the paper inside the paper containing box, and thus the infrared signals cannot reach the infrared receivers 22. After the paper quantity has decreased by a certain extent, one of the infrared detection components 2 is no longer blocked by the paper (but the other infrared detection component 2 is still blocked by the paper), the infrared signals emitted from the infrared emitter 21 reflect off the inner wall of the paper containing box and thereby are received by the infrared receivers 22. At this moment, the control component 4 controllably causes the wireless signal emitting component 3 to emit and send a wireless reminding signal to a management mechanism (not shown), thereby informing the paper quantity detection device of a slight reduction in the paper quantity.

When the paper quantity keeps decreasing until the other infrared detection component 2 is no longer blocked by the paper, the infrared signals emitted from the two infrared emitters 21 are received by the infrared receivers 22, respectively. At this moment, the control component 4 controllably causes the wireless signal emitting component 3 to emit and send a wireless warning signal to the management mechanism (not shown), so as to inform the paper quantity detection device of the reduction in paper quantity and the resultant replacement need. The infrared emitters 21 emit the infrared signals continuously or at time intervals.

Therefore, the paper quantity detection device 100 of the present disclosure evaluates the remaining paper quantity cyclically, consumes little electric power, wirelessly communicates with a management mechanism, and effectively reduces manual confirmation time and cost.

Referring to FIG. 2, in this embodiment, the paper quantity detection device 100 further comprises an outer casing 5 for covering the circuit board 1 to protect the circuit board 1. The outer casing 5 consists of a front part and a rear part to facilitate its assembly. Two hollowed-out portions 51 corresponding in position to the two infrared detection components 2, respectively, are disposed on the outer casing 5. The outer casing 5 has two baffles 52 not only disposed at the hollowed-out portions 51, respectively, but also disposed between the infrared emitter 21 and the infrared receiver 22 of one of the infrared detection components 2 and disposed between the infrared emitter 21 and the infrared receiver 22 of the other infrared detection component 2, respectively. The baffles 52 prevents infrared crosstalk and thus achieves accurate detection.

Furthermore, in this embodiment, the paper quantity detection device 100 further comprises a battery sheath 6 and a battery 7 which are disposed on the circuit board 1. The battery sheath 6 encloses and protects the battery 7. The battery 7 supplies power to the two infrared detection components 2, wireless signal emitting component 3 and control component 4.

Figure 3:
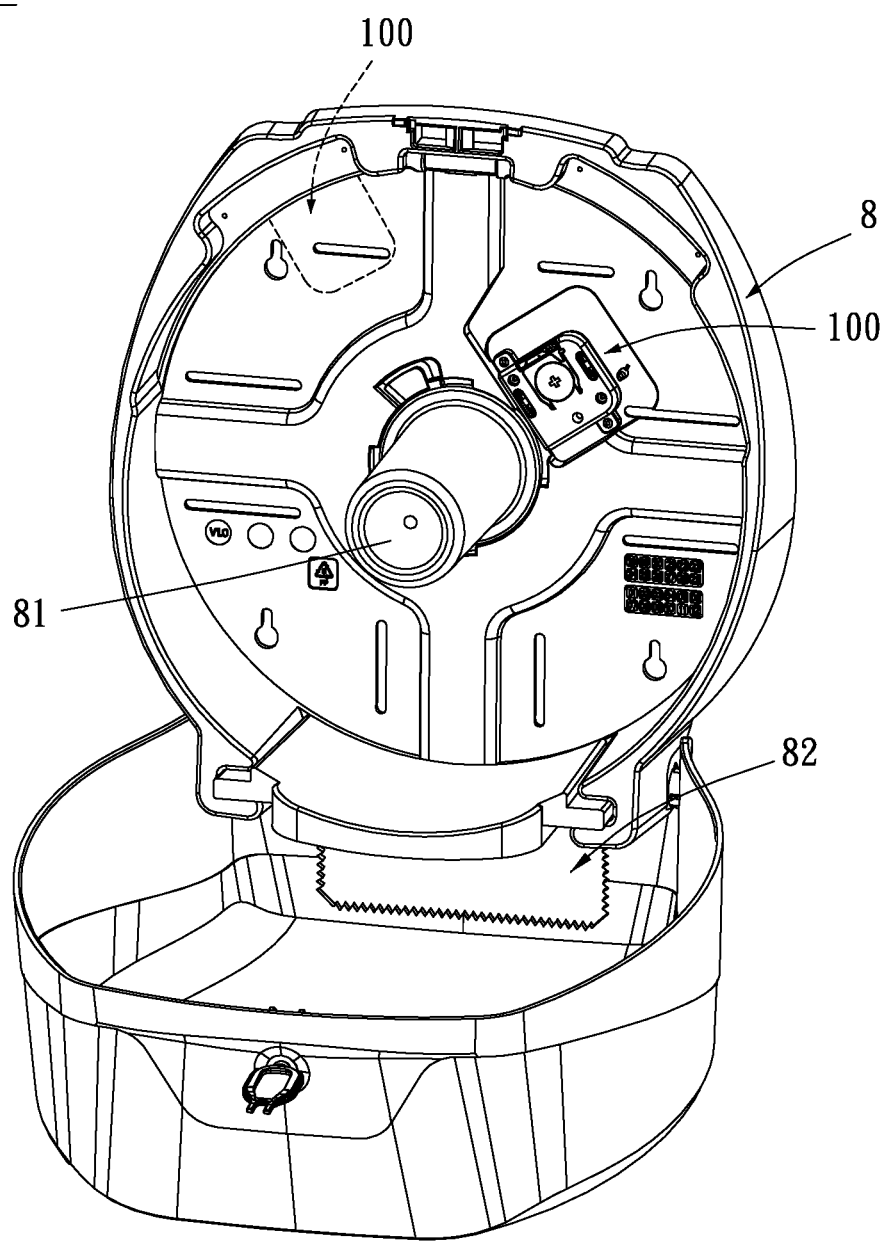
FIG. 3 is a perspective view of a roll paper containing box according to an embodiment of the present disclosure.

The present disclosure further provides a roll paper containing box 200. Referring to FIG. 3, the roll paper containing box 200 comprises a casing 8 and the paper quantity detection device 100.

The casing 8 has an axle 81 and an outlet 82. Paper (not shown) winds around the axle 81 to form a paper roll and is discharged via the outlet 82.

In this embodiment, the paper roll is consumed, starting from its outermost part, and thus the paper quantity detection device 100 is positioned proximate to the axle 81. After the paper quantity has decreased by a certain extent, the outer one of infrared detection components 2 is exposed. After the paper quantity has decreased to or is approximating to null, both the two infrared detection components 2 are exposed, thereby generating a warning signal.

However, the present disclosure is not limited to the aforesaid embodiment. In a variant embodiment, the paper roll is consumed, starting from its innermost part, and thus the paper quantity detection device 100 (indicated by a dashed line) is positioned distal to the axle 81 and thus located at the outermost position. After the paper quantity has decreased by a certain extent, the inner one of the infrared detection components 2 is exposed. After the paper quantity has decreased to or is approximating to null, both the two infrared detection components 2 are exposed, thereby generating a warning signal.

In a variant embodiment, a reflection portion (not shown) is disposed on the inner side of the casing 8 and corresponds in position to the light paths of the infrared emitters 21, such that the infrared signals emitted from the infrared emitters 21 reflect off the reflection portion and propagate to the infrared receivers 22. However, the present disclosure is not limited to the aforesaid embodiment. In a variant embodiment, the inner side of the casing 8 is made of a material conducive to reflection of the infrared signals.

Figure 4:
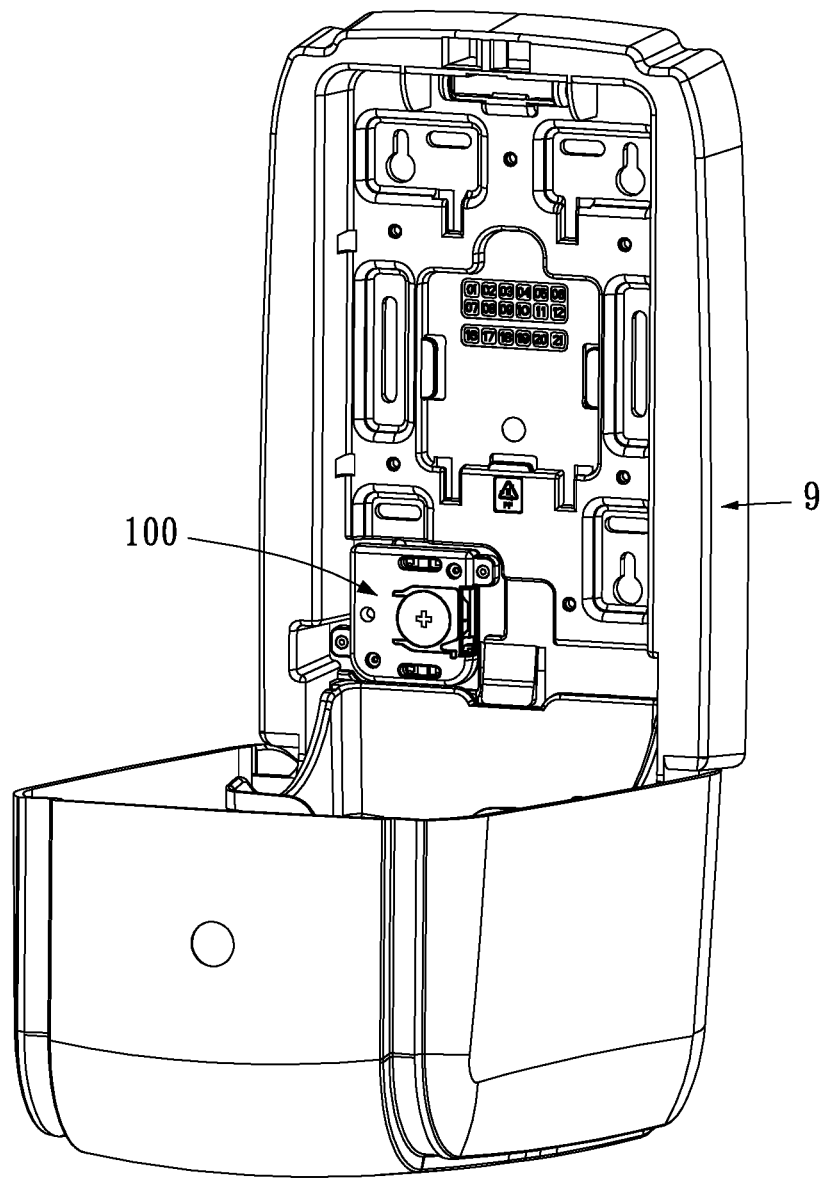
FIG. 4 is a perspective view of a stacked paper containing box according to an embodiment of the present disclosure.

The present disclosure further provides a stacked paper containing box 300. Referring to FIG. 4, the stacked paper containing box 300 comprises a casing 9 extending in the gravity direction and the paper quantity detection device 100.

The casing 9 has an outlet (not shown) facing downward. Users withdraw paper out of the casing 9 via the downward-facing outlet, thereby allowing the remaining paper to sag under the gravity.

The paper quantity detection device 100 is disposed in the casing 9 and is preferably positioned proximate to the outlet of the casing. After the paper quantity has decreased by a certain extent, the upper one of the infrared detection components 2 is exposed. After the paper quantity has decreased to or is approximating to null, both the two infrared detection components 2 are exposed, thereby generating a warning signal.

In a variant embodiment, a reflection portion (not shown) is disposed on the inner side of the casing 9 and corresponds in position to the light paths of the infrared emitters 21, such that the infrared signals emitted from the infrared emitters 21 reflect off the reflection portion and propagate to the infrared receivers 22. However, the present disclosure is not limited to the aforesaid embodiment. In a variant embodiment, the inner side of the casing 9 is made of a material conducive to reflection of the infrared signals.

Therefore, the paper quantity detection device 100 of the present disclosure is applicable to paper containing boxes in various forms.

While the present disclosure has been described by means of specific embodiments, numerous modifications and variations could be made thereto by those skilled in the art without departing from the scope and spirit of the present disclosure set forth in the claims.

What is claimed is:

1. A roll paper containing box, comprising:
 a casing having an axle and an outlet, wherein the direction of reduction in paper is along the diameter direction of the axle; and
 a paper quantity detection device disposed in the casing, wherein the paper quantity detection device comprises a circuit board, two infrared detection components, a wireless signal emitting component and a control component,
 the two infrared detection components are disposed on two opposing sides of the circuit board, respectively, the two infrared detection components are disposed along in the direction of reduction in paper, and each infrared detection components comprises an infrared emitter and an infrared receiver,
 the wireless signal emitting component is disposed on the circuit board,
 the control component is disposed on the circuit board and is signal-connected to the two infrared emitters, the two infrared receivers and the wireless signal emitting component,
 the control component controllably causes the wireless signal emitting component to emit a wireless reminding signal when only one of the infrared receivers receives an infrared signal, and
 the control component controllably causes the wireless signal emitting component to emit a wireless warning signal when the two infrared receivers receive an infrared signal.

2. The roll paper containing box of claim 1, wherein the paper quantity detection device is positioned proximate to the axle.

3. The roll paper containing box of claim 1, wherein the paper quantity detection device is positioned distal to the axle.

4. A stacked paper containing box, comprising:
 a casing extending in gravity direction and having an outlet facing downward wherein the direction of reduction in paper is along the gravity direction; and
 a paper quantity detection device disposed in the casing, wherein the paper quantity detection device comprises a circuit board, two infrared detection components, a wireless signal emitting component and a control component,
 the two infrared detection components are disposed on two opposing sides of the circuit board, respectively, the two infrared detection components are disposed along the direction of reduction in paper, and each infrared detection components comprises an infrared emitter and an infrared receiver,
 the wireless signal emitting component is disposed on the circuit board,
 the control component is disposed on the circuit board and is signal-connected to the two infrared emitters, the two infrared receivers and the wireless signal emitting component,
 the control component controllably causes the wireless signal emitting component to emit a wireless reminding signal when only one of the infrared receivers receives an infrared signal, and
 the control component controllably causes the wireless signal emitting component to emit a wireless warning signal when the two infrared receivers receive an infrared signal.

* * * * *